(12) United States Patent
Chandrashekhar et al.

(10) Patent No.: US 9,734,384 B2
(45) Date of Patent: Aug. 15, 2017

(54) METHOD AND A SYSTEM FOR MATCHING FINGERPRINT IMAGES OBTAINED FROM DIFFERENT FINGERPRINT IMAGE CAPTURING DEVICES

(71) Applicants: Savitribai Phule Pune University, Pune (IN); Persistent Systems Limited, Pune (IN)

(72) Inventors: Garware Bhushan Chandrashekhar, Pune (IN); Abhyankar Aditya Shankar, Pune (IN); Kelkar Shubhangi Uday, Pune (IN)

(73) Assignees: SAVITRIBAI PHULE PUNE UNIVERSITY (IN); PERSISTENT SYSTEMS LIMITED (IN)

( * ) Notice: Subject to any disclaimer, the term of this patent is extended or adjusted under 35 U.S.C. 154(b) by 56 days.

(21) Appl. No.: 14/961,857

(22) Filed: Dec. 7, 2015

(65) Prior Publication Data
US 2016/0247012 A1    Aug. 25, 2016

(30) Foreign Application Priority Data
Feb. 19, 2015    (IN) .......................... 542/MUM/2015

(51) Int. Cl.
*G06K 9/00*    (2006.01)
(52) U.S. Cl.
CPC ..... *G06K 9/00073* (2013.01); *G06K 9/00093* (2013.01)

(58) Field of Classification Search
CPC ....................... G06K 9/00073; G06K 9/00093
See application file for complete search history.

(56) References Cited

PUBLICATIONS

Ratha, Nalini K., et al. "Robust fingerprint authentication using local structural similarity." Applications of Computer Vision, 2000, Fifth IEEE Workshop on.. IEEE, 2000.*

(Continued)

*Primary Examiner* — Chan Park
*Assistant Examiner* — Raphael Schwartz
(74) *Attorney, Agent, or Firm* — HM Law Group LLP; Vani Moodley, Esq.

(57) ABSTRACT

The present invention describes a method and the system for matching fingerprint images obtained from different fingerprint image capturing devices and implemented in an electronic device. Specifically, the method has steps of identifying minutiae and then identifying core point of the fingerprint images. Thereafter, a line of symmetry is determined and minutiae are identified by matching ridge count, location angle and orientation angle of a first image of the fingerprint images with a second image of the fingerprint images is identified. Thereafter, prominent minutiae from the candidate minutiae having three adjacent minutiae with same local structure are identified. Out of scope minutiae are eliminated by non-linear registration of fingerprint images based on ridge-count and position angle. Thereafter, matching score is generated based on number of candidate minutiae, prominent minutiae and common overlapped minutiae after non-linear registration of the second fingerprint image in comparison with the first fingerprint image for authentication.

6 Claims, 7 Drawing Sheets

(56) References Cited

PUBLICATIONS

Jiang, Xudong, and Wei-Yun Yau. "Fingerprint minutiae matching based on the local and global structures." Pattern recognition, 2000. Proceedings. 15th international conference on. vol. 2. IEEE, 2000.*
Ross, Arun, and Anil Jain. "Biometric sensor interoperability: a case study in fingerprints." International Workshop on Biometric Authentication. Springer Berlin Heidelberg, 2004.*

* cited by examiner a) Whorl   b) Arch   c) left loop   d) Right loop   e) Tented Arch

METHOD AND A SYSTEM FOR MATCHING FINGERPRINT IMAGES OBTAINED FROM DIFFERENT FINGERPRINT IMAGE CAPTURING DEVICES

This application claims the benefit of priority to Indian Patent Application No. 542/MUM/2015 dated Feb. 19, 2015, the entire specification and drawing of which are incorporated herein by reference.

FIELD OF THE INVENTION

The present invention relates to a system and a method for matching fingerprint images for biometric authentication. More particularly, the present invention relates to a method and a system for matching fingerprint images obtained from different biometric fingerprint sensors having different technology, resolution and fingerprint image capturing area.

BACKGROUND OF THE INVENTION

Automatic Fingerprint Identification Systems (herein after referred as "AFIS") is an essential component of effective personal identification, as fingerprint features are easy to use, difficult to share and cannot be misplaced or handed over to others. The fingerprints intrinsically represent bodily identity of an individual, therefore the fingerprints are considered more reliable than traditional token based (ID card) systems or passwords. Every individual human being has unique features on the fingerprint and they remain constant for the entire lifetime of the individual. This is a reason, why use of the AFIS is growing day by day.

Performance of the AFIS at present degrades mainly because of following three problems:
Interoperability issue,
Non-linear elastic distortion, and
Partial fingerprint impressions.

These issues limit large scale deployment of the AFIS in a distributive manner.

Before solving interoperability issue, it is important to identify what are the sources of it. There are differences in technology and working principle of existing fingerprint sensors. The basic difference is in the interaction means used by the existing fingerprint sensors. There are touch, swipe and touch free fingerprint identification devices. The sensors used in these devices are optical sensors, capacitive sensors, thermal sensors and the like. Characteristics of each of the sensor, such as physical design, resolution and capture area determines type and quality of the fingerprint image.

Interoperability Issue in AFIS is as Follows:

Biometric sensor interoperability refers to the ability of a system to compensate for the variability introduced in the raw biometric data image of an individual due to use of different sensors (here biometric data refers to digital copy of fingerprint images). It is observed that performance of most of the AFIS drops when two different sensors/devices/scanners are used for enrollment and verification. Most fingerprint matchers there-fine have restricted ability to compare fingerprints originating from two different sensors/devices, which results in poor inter-sensor detection.

Issues Relating to Non-Linear Elastic Distortions of Fingerprint Image:

Fingerprint image generation is a process of mapping 3D ridge structure on the plane surface of the sensor. Due to variations of skin elasticity and applied pressure some non-linear distortions are introduced in the fingerprint image. These non-linear distortions are difficult to model priori due to inconsistency of elasticity and pressure. Also, these non-linear distortions are not consistent in different types of sensors. The non-linear distortions are responsible for unnecessary false rejections. In order to incorporate these false-rejection of the images, the system and the method has to be operated with high false accept rate which is very dangerous and not acceptable for security application. It clearly shows huge performance drop when cross-compared between two databases.

Issues Related to Partial Fingerprint Images:

Partial fingerprint matching is still a challenging problem. Now a day, fingerprint authentication on handheld commercial devices like cell phones, laptops etc, are gaining lot, of popularity. Such devices are equipped with fingerprint sensors with very small capture area which results in acquisition of different parts of the same finger in multiple acquisitions. Most of the minutiae based fingerprint matching algorithms fail to incorporate such situation.

PRIOR RELATED WORK (PRIOR ART)

Interoperability issue in the AFIS was first discussed by A. Jain in his Case Study on "Biometric Sensor Interoperability", A. Ross proposed a "Thin Plate Spline Model" in his case study to compensate effect of different sensors/devices, A. Jain and A. Ross compared one to one correspondence between minutiae pairs in fingerprint image of same person taken from two different fingerprint sensors/devices. These studies are set between given two sensors and recites difficulty in accommodating sensor interoperability in biometric systems. Every time when new hardware/device is used again new model need to be established with all existing sensors/devices.

If fingerprint image has large non-linear distortions then average inter-ridge frequency of the two images of same person may differ, which may lead to false non-match or rejection. Also, this method does not remove distortions along the ridges. Many researchers tried to compensate non-liner distortions at matcher level, S. Chikerrur proposed graph based fingerprint representation and matching method, which improves the AIFS performance compared to NIST's BOZORTH3 fingerprint: matching method. This approach also used Euclidean distance between neighboring minutiae as a measure to find minutiae matching. T. Bhavani addressed interoperability issue at a matcher level and used ratios of the relative Euclidean distances instead of direct distance. But none of these methods are effective. As shown in FIG. 1., '—o—' curve represents the performance curve when images from the (Data Base 1) DB1 (Images captured by optical sensor with 500 dpi and single finger capture area) are compared with the images from the DB1 itself Equal Error Rate (EER) of this experiment is 3.41%. Similarly, the '—x—' curve shows the performance characteristics When images from the (Data Base 2) DB2 (images captured by optical sensor with 500 dpi and multi-finger capture area) are compared with Db2 itself and EER. is 2.48%. The curve '—◇—' shows the performance characteristics when the images from Db1 are compared with the images from Db2 and significant EER drop is reported i.e. 9.21%.

FIG. 2 shows four fingerprint images of same subject from FVC2000 database. Image a) and b) are captured from an optical sensor and image c) and d) are captured from capacitive sensor. in order to limit effect of Ultra finger distortions, these images with minimum elastic distortions for illustration purpose are chosen. As explained above, due to different technology capture area and resolution some non-linear distortions are introduced in the fingerprint images. Minutiae A and B are closer in images a) and B) compared to the minutiae A and. B in images c) and d), On the other hand, minutiae C and D are closer in images c) and D) compared to minutiae C. and D in image a) and b).

Therefore, there is a need to provide a method and system for matching fingerprint images obtained from different biometric authentication devices with different sensors and to overcomes all the drawbacks of the prior art.

OBJECTS OF THE PRESENT INVENTION

Object of the present invention is to provide a method and a system for matching fingerprint images obtained from different fingerprint image capturing devices having different sensors.

Another object of the present invention is to provide a method and a system for matching fingerprint images obtained from different fingerprint image capturing devices having different sensors, which is compatible with all existing Automatic fingerprint Identification Systems (AFIS).

Yet another object of the present invention is to provide a method and a system for matching fingerprint images obtained from different fingerprint image capturing devices having different sensors, which can authenticate the fingerprint image even in case of elastic distortion due to uneven pressure applied during capturing fingerprint image and due to elasticity of the skin or tilted finger during scanning.

One more objective of the present invention is to provide a method and a system for matching fingerprint images obtained from different fingerprint image capturing devices having different sensors with variable capture areas, which is capable for matching partial fingerprint image.

SUMMARY OF THE INVENTION

According to one aspect of the present invention there is provided a method for matching fingerprint images obtained from different fingerprint image capturing devices, partially captured images and nonlinear deformed images and implemented in an electronic device. The method having step of identifying minutiae of the fingerprint images. Thereafter, identifying a core point of the fingerprint images. Further, determining line of symmetry of the fingerprint images. Thereafter, identifying candidate minutiae with matching ridge count, location angle and orientation angle from a first fingerprint image and a second fingerprint image of the fingerprint images. Further, identifying prominent minutiae from the above identified candidate minutiae having three adjacent minutiae with similar local structure. Thereafter, eliminating out of scope minutiae by non-linear registration of fingerprint images based on ridge-count and position angle. At least generating matching score based on number of candidate minutiae, prominent minutiae and Common overlapped minutiae after non-linear registration of the second fingerprint image in comparison with the first fingerprint image for authentication.

The identification of minutiae by matching ridge count, location angle and orientation angle of a first image of the fingerprint images with the second image of the fingerprint images is done by using a global matching engine.

The identification of the minutia having three adjacent minutiae with same local structure (angle and distance) is performed by a local matching engine.

The out of scope minutiae are eliminated by dividing the fingerprint in into eight parts and removing the non-matching portions.

According to another aspect of the present .invention there is provided a system for matching fingerprint images obtained from different biometric authentication devices implemented in an electronic device. The system having a means for identification of minutiae, a means for identification of a core point, a means for identification of line symmetry, a global matching engine, a local matching engine and a matching engine. The global matching engine is provided tor identifying minutiae by matching ridge count, location angle and orientation angle of the first image of the fingerprint images with the second image of the fingerprint images. Further, the local matching engine is provided for identification of as minutiae having three adjacent minutiae with same orientation, thereafter eliminating out of scope minutiae he non-linear registration of fingerprint images based on ridge-count and position angle. The matching engine is provided for generating matching score of the second fingerprint image in comparison with the first fingerprint image for authenticating the fingerprint image. The electronic device can be a computer, server or a biometric device.

DETAILED DESCRIPTION OF THE INVENTION

An embodiment of this invention, illustrating its features, will now be described in detail. The words "comprising," "having," "containing," and "including," and other forms thereof, are intended to be equivalent in meaning and. be open ended in that an item or items following any one of these words is not meant to be an exhaustive listing of such item or items, or meant to be limited to only the listed item or items.

The terms "a" and "an" herein do not denote a limitation of quantity, but rather denote the presence of at least one of the referenced item.

The disclosed embodiments are merely exemplary of the invention, which may be embodied in various forms.

The present invention provides a method and a system for matching fingerprint images obtained from different fingerprint image capturing devices/sensors. Further, the method and the system are compatible with all existing Automatic Fingerprint Identification Systems (AFIS). Also, the method and the system can be used for authenticating the fingerprint image even in case of elastic distortion due to uneven pressure applied during capturing fingerprint image and due to elasticity of the skin or tilted finger during scanning. Further, the method and the system are suitable for partial fingerprint images obtained from different fingerprint scanners having variable capture area. Moreover, the method and the system are robust and have higher accuracy.

The advantages and features of the present invention will become better understood with reference to the following detailed description and claims taken in conjunction with the accompanying drawings, wherein like elements are identified with like symbols.

Figure 1:
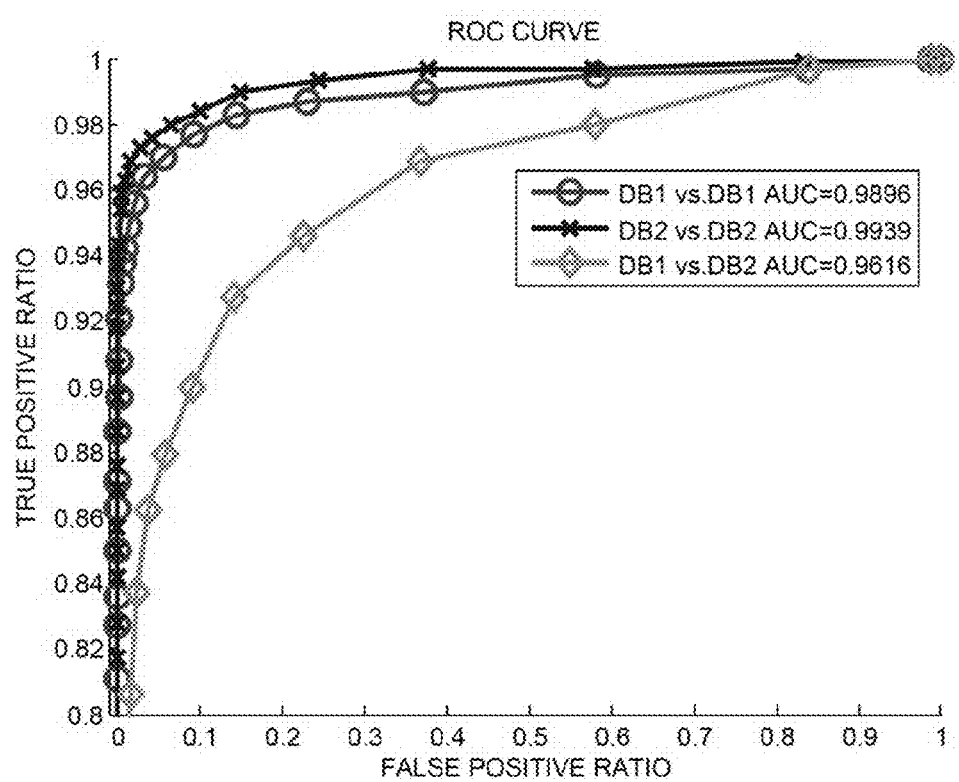
FIG. 1 shows graph representing performance curves of the prior art methods.
Figure 2:
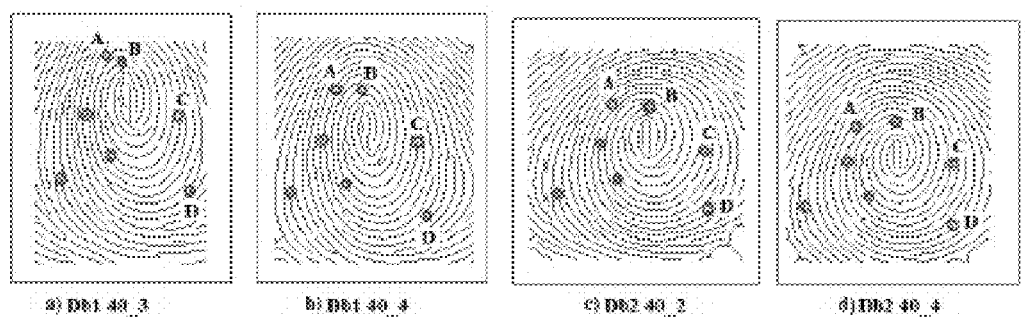
FIG. 2 shows four fingerprint images obtained from different sensors of the prior art.
Figure 3:
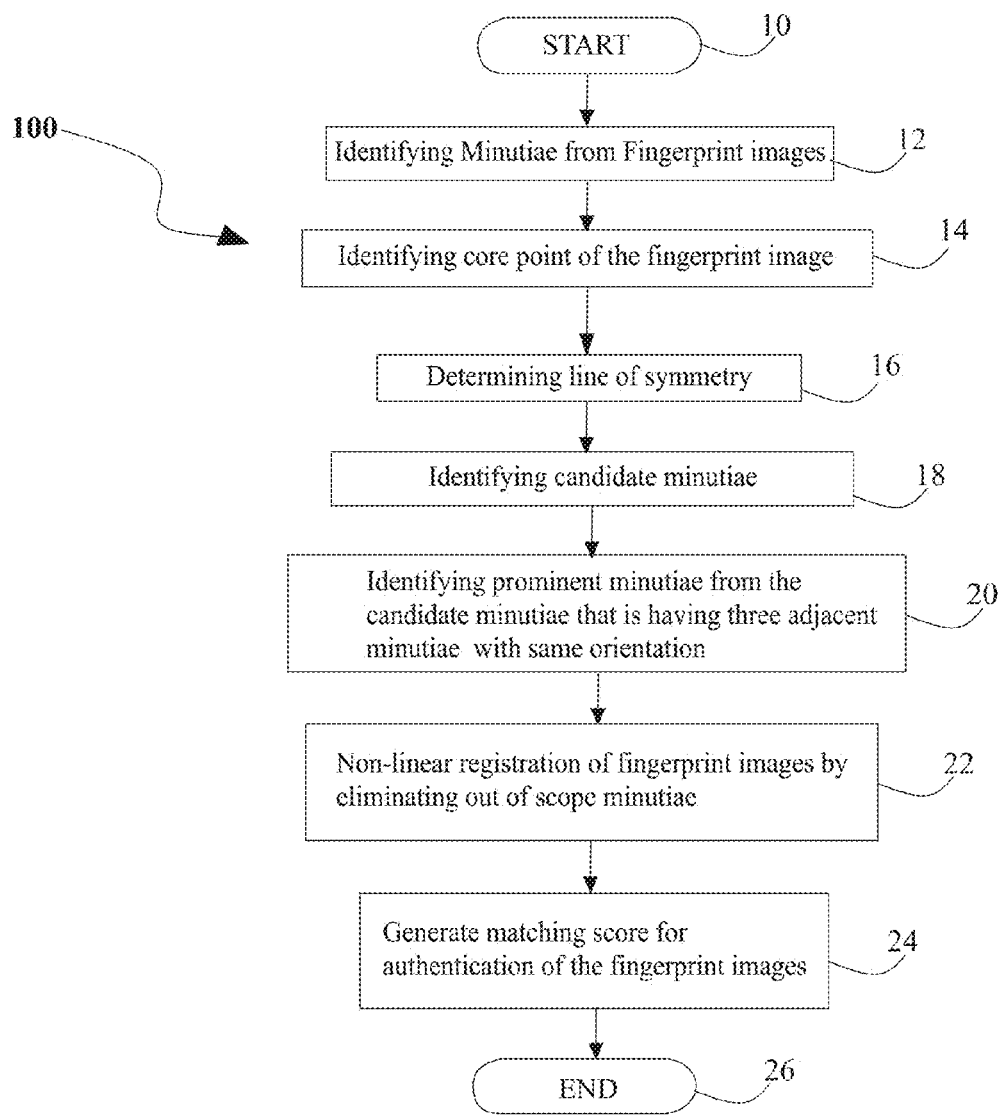
FIG. 3 shows a flow chart of a method for matching fingerprint images in accordance with the present invention is illustrated.

Referring now to FIG. 3, a flow chart of a method 100 for matching fingerprint images obtained from different fingerprint image capturing devices (herein after referred as the "devices") having different sensors in accordance with the present invention is illustrated. The method 100 starts at step 10.

At step 12, minutiae are identified from the fingerprint images obtained from the different devices. The minutiae can be identified in an electronic device, such as a remote computer, a server or a biometric device by using a feature extracting engine. The minutiae are ridge ending and ridge bifurcation points of the fingerprint, images. These minutiae are expressed in {X, Y, Θ, Q} format, wherein X and Y are Cartesian co-ordinates of the minutiae, Θ is orientation angle in degrees calculates as per the ISO 19794 2 format and Q is the quality of the minutiae.

Figure 4:
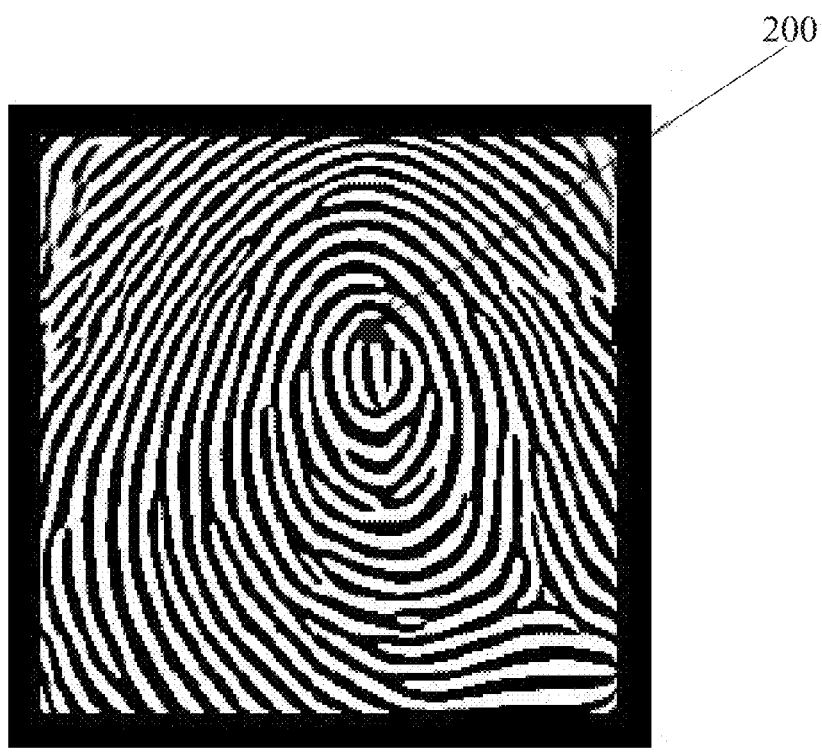
FIG. 4 shows identified core point on a fingerprint image.

At step 14, a core point 200 (refer FIGS. 4 and 6) is identified, Correct identification of the core point 200 is the most important step in this method 100 as the ridge count is calculated with reference to the core point 200. Specifically, in the present invention core point is identified manually, other methods such as reliability approach engine or poincare index method can be used because of its accuracy which is obvious to a person skilled in the art. The core point 200 may be identified in an electronic device, such as a remote computer, a server or a biometric device. FIG. 4 shows a core point 200 identified in a fingerprint image.

Figure 5:
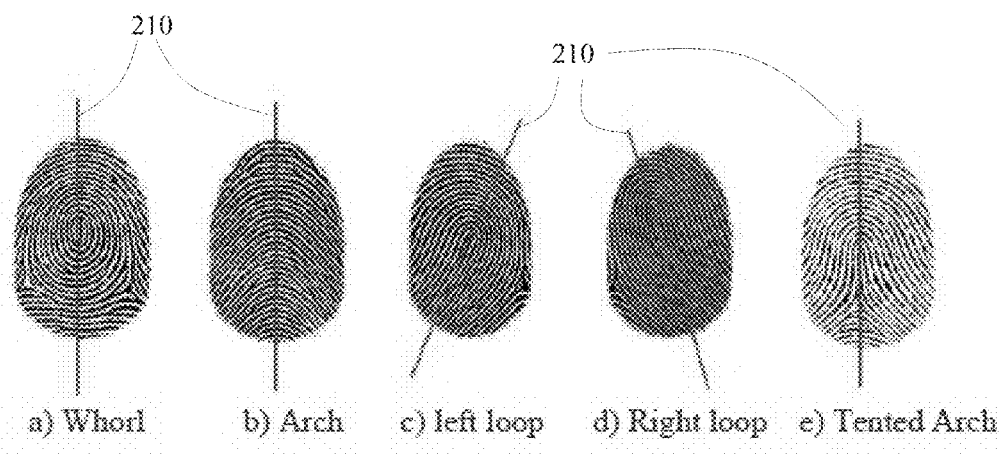
FIG. 5 shows identified line of symmetry of various fingerprint images.
Figure 6:
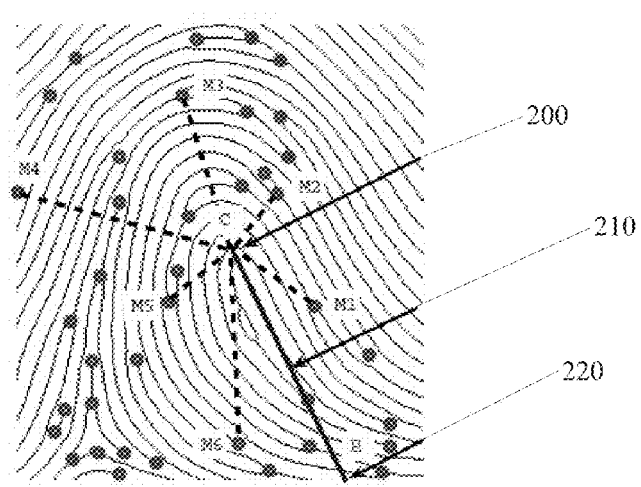
FIG. 6 shows identified ridge count (RC), location angle ($\phi$) and orientation angle ($\Theta$) of the minutiae is identified on a fingerprint image.

Thereafter, at step 16, a line of symmetry 210 of the fingerprint images is determined manually. To determine line of symmetry a base point is identified. The line joining the core point and the base point is the line of symmetry. Alternatively, a principle component analysis engine can be used for identifying the line of symmetry, which is obvious to a person skilled in the art. The principle component analysis engine may be installed in the electronic device. The line of symmetry 210 may be identified in an electronic device, such as a remote computer, a server or a biometric device. Every fingerprint minutiae has a natural directional flow and their distribution is roughly symmetrical about the virtual line. FIGS. 5 and 6 illustrate the line of symmetry 210 in the fingerprint image. For every minutiae ridges are counted between the core point 200 and each of the peripheral minutiae. Also, the location angle is calculated from the base point 200 to each of the minutiae in anti-clock wise direction. These features like the minutiae, the core point and the line of symmetry are used for further matching of the fingerprint images.

At step 18, candidate minutiae are identified from a first fingerprint image and a second fingerprint image of the fingerprint images. The minutiae with matching ridge count (RC), location angle (φ) and orientation angle (Θ) from the first fingerprint image and the second fingerprint image are considered candidate minutiae. Wherein the first fingerprint image refers to the fingerprint image initially received for future authentication and the second fingerprint image is the other fingerprint image that needs to be matched with the first image for authentication. In the present embodiment, the candidate minutiae are identified by using a Global matching engine. For the purpose of explaining working of the Global matching engine, lets N1 and N2 be the corresponding minutiae in the first fingerprint image and the second fingerprint image respectively. FIG. 6 shows identified ridge count (RC), location angle (φ) and orientation angle (Θ) of the minutiae on a fingerprint, image.

The global matching engine first identifies the candidate minutiae, Thereafter, a table is generated for matching minutiae. The table contains details of each of the potential minutiae having corresponding details {X, Y, RC, φ, Θ, Q}. Two tables, Table 'A' and Table 'B' are created respectively for the first fingerprint image and the second fingerprint image. The two tables are compared for matching minutiae to matching the ridge count (RC), location angle (φ) and orientation angle (Θ). Further, threshold values are set for each of the matching parameter, which could take care of noise in the fingerprint images, if the values of ridge count (RC), location angle (φ) and orientation angle (Θ) are equal to or less then the threshold value then only it is considered as matching. For example, if the fingerprint image has broken ridges or because of elastic nature of finger skin, sometimes ridges may touch each other.

Hence there is possibility of small variation in the ridge count. To take care of such distortions and for the purpose of explanation only, the threshold value of ridge count RC may be considered 2, the location angle φ as 20 degree and the orientation angle Θ as 90 degree. Narrower or broader threshold values can be sent, depending upon the type of application and requirement of accuracy of the matching required thereof.

Further, the value of the location angle is dependent on the rotation of the fingerprint image and hence it's very difficult to set the threshold. For the purpose of explanation only, the threshold value of the location angle φ is set at 90 degree. This is just to check the type of minutiae, whether it is a ridge bifurcation or ridge ending, the orientation difference would be 180 degrees in accordance with the ISO 19794 2 format. As the tolerance window is kept in the thresholds in above three criteria there is a possibility of multiple matching minutiae found in Table B corresponding to single minutiae in the Table A. To segregate these minutiae, a priority scheme is used. Highest priority is given to the ridge count (RC). From all the possible matches, that minutia will be selected as a candidate minutiae whose abs (Table A. RC-Table B. RC) value is minimum. It may happen that there are more than one minutia in possible matching set, which are having same ridge count number, in such a case, next priority is given to the location angle. From all the possible matched minutiae with same ridge count, are selected as a candidate minutiae with minimum abs (Table A.φ-Table B. φ) value. In very rare situations one may come across multiple matches with same ridge count and same location angles. In such case, minutia having height quality is selected as candidate minutiae.

Figure 7:
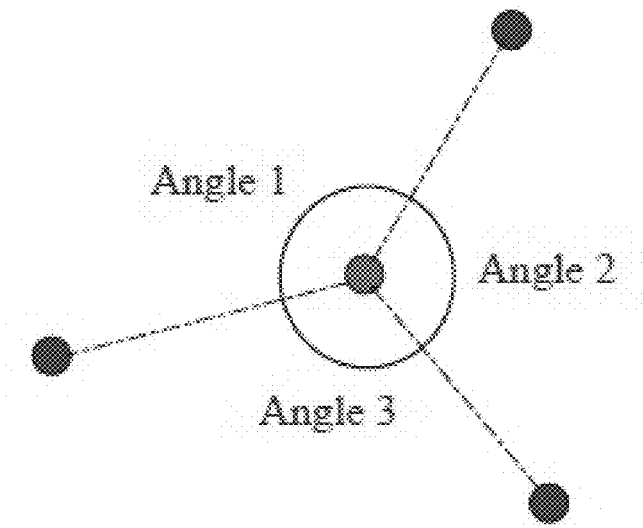
FIG. 7 shows local matching process with three adjacent candidate minutiae.

1. Ridge count 'RC' of the two minutiae must be almost same abs (Table-A (i).RC-Table-B(j).RC≤$RC_{Th}$ 2. Location Angle 'φ' of the two minutiae should be almost same abs (Table-A (i). φ-Table-B(j). φ≤$φ_{Th}$ 3. Orientation Angle 'Θ' of the two minutiae should be close abs (Table-A (i). Θ-Table-B(j).Θ≤$Θ_{Th}$ Thereafter, at step 20, prominent minutiae from the above identified candidate minutiae are further sorted by identifying, minutiae having three nearest adjacent candidate minutiae with same local structure. The similar local structure here specifically refers to distance of three nearest candidate minutiae from a center minutiae and corresponding angles there between at the center minutiae as shown in FIG. 7. A local matching engine is used for identifying such prominent minutiae. After global matching process the candidate minutiae are obtained. One to one correspondence is obtained just on the basis of the ridge count and location angle. But this information is not sufficient to declare it as a perfect match unless the local structure of the minutiae is similar in both the first fingerprint image and the second fingerprint image. For example, let 'Nb' be the number of candidate minutiae obtained from local matching.

Further, the angles between three nearest minutiae and their distance from the reference candidate minutia are obtained. Thus a perfect match table entry is created for each candidate minutiae as {Angle1, Distance1, Angle2, is Distance2, Angle3, Distance3}. Now each candidate minutiae in Table-A will be compared with each candidate minutiae in Table-B based On following criteria:

1. Angle1 of the two minutiae must be almost same:
   Abs (Table-$_A$(i).Angle1-Table-$_B$(j).Angle1)≤Angle$_{Th}$
2. Distance 1 of the two minutiae should be almost same:
   abs (Table-$_A$(i).Distance1-Table-$_B$(j).Distance1)≤Distance$_{Th}$
3. Angle2 of the two minutiae must be almost same:
   abs (Table-$_A$(i).Angle2-Table-$_B$(j).Angle2)≤Angle$_{Th}$
4. Distance I of the two minutiae should be almost same:
   abs (Table-$_A$(i).Distance2-Table-$_B$(j).Distance2)≤Distance$_{Th}$
5. Angle1 of the two minutiae must be almost same:
   abs (Table-$_A$(i).Angle3-Table-$_B$(j).Angle3)≤Angle$_{Th}$
6. Distance 1 of the two minutiae should be almost same:
   abs (Table-$_A$(i).Distance3-Table$_B$(j).Distance3)≤ Distance $_{Th}$ If all six criteria are satisfied then only the candidate minutiae pair is considered as a perfect match pair and those candidate minutiae are converted to perfect match points or prominent minutiae.

Figure 8:
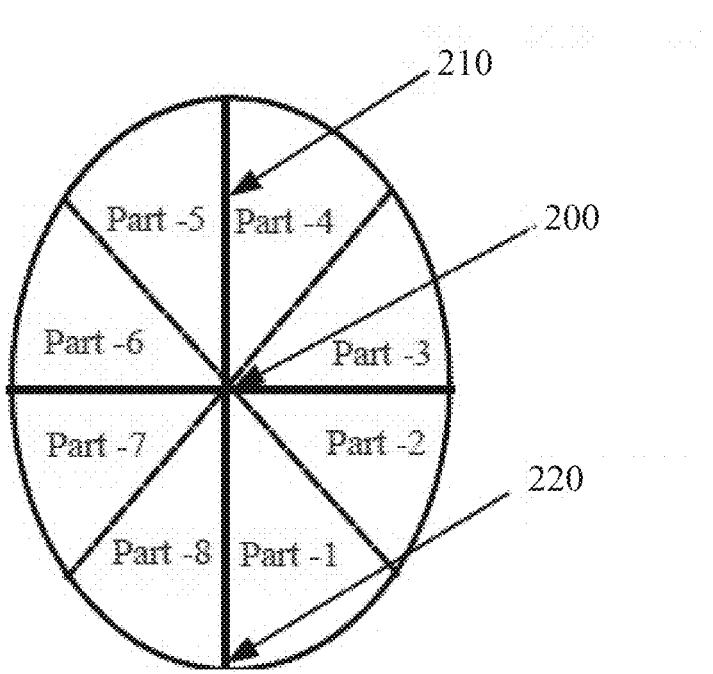
FIG. 8 shows fingerprint, image divided into eight parts.

At step 22, non-linear .registration of fingerprint images, to eliminate out of scope minutiae from the first fingerprint image and the second fingerprint image. Many times it is observed that the match score of the two fingerprint images is very low because the overlapping region between the first and the second fingerprint images is very small. This matching engine considers only those minutiae in to the consideration which exist in the first and the second fingerprint images. In order to eliminate unwanted minutiae the fingerprint image is divided in eight parts as shown in the FIG. 8. Now consider only those minutiae which lie in area of part 1. The Minutia in part 1 is identified, which has largest ridge count and set MaxA$_{Count1}$ with that value. Similarly, for second fingerprint image B. the minutia with largest ridge count value in part 1 is identified and set MaxA$_{Count1}$ with that value.

If (MaxA$_{Count1}$≤MaxA$_{Count2}$)
Max$_{Count1}$=MaxA$_{Count1}$
else
Max$_{Count1}$=Max$_{Count1}$
end Hence all minutiae in pard in both the images whose ridge count is greater than Max$_{Count1}$ are eliminated and remaining minutiae are termed as common overlapping minutiae. Same procedure is followed for all the remaining parts in both images and out of scope minutiae are eliminated.

At step 24 matching score is generated based on number of candidate minutiae, prominent minutiae and common overlapped minutiae alley non-linear registration of the second fingerprint image in comparison with the first fingerprint image for matching and authentication.

EXAMPLE

BL1$_n$: be the number of common overlapping minutiae in the first fingerprint image after nonliner registration of fingerprint images by eliminating out of scope minutiae.

BL2$_n$: be the number of common overlapping minutiae in the second fingerprint image after nonliner registration of fingerprint images by eliminating out of scope minutiae.

B$_n$: be the number of candidate minutiae after global matching:

G$_n$: be the number of prominent minutiae i.e. perfectly matched minutiae after local matching:

$$\text{MatchScore}=(W_g*G_n+W_B*B_n)/(W_{bl}*(BL1_n+BL2_n))$$

Where,

W$_g$, W$_b$ and W$_{bl}$ are the weighted multipliers for '—◇—', '—x—' and BLACK minutiae respectively. The values of these multipliers are set heuristically. For implementation values are set, where W$_g$ as 100, value of W$_b$ as 10 and W$_{bl}$ as 20.

The method ends at step 26.

Further, in another aspect of the present invention there is provided a system for matching fingerprint images obtained from different fingerprint image capturing devices, partially captured images and nonlinear deformed images. The system in explained in conjunction with the above described of method for the sake of brevity. The system has means for identification of minutiae, means for identification of a core point, means for identification of line symmetry, a global matching engine, a local matching engine and a match score generating engine. The means for identification of minutiae of the fingerprint images as explained in step 12 of method 100 enables to identify minutiae on the fingerprint images. The means for identification of a core point of the fingerprint images as explained in step 14 enables to identify core point on the fingerprint image. Further, the means for identification of the line symmetry 210 of the fingerprint images as explained in step 16 of method 100 enables to identify base point 220 and therefore enables to identify and draw line of symmetry thereof.

Further, the global matching engine is used for identifying minutiae by matching ridge count, location angle and orientation angle of the first image of the fingerprint images with the second image of the fingerprint images as explained in step 18 of method 100. The local matching engine is used for identification of a minutia having three adjacent minutiae with same local structure, thereafter as explained in step 20 of method 100, The match score generating engine for eliminating, out of scope minutiae and matching the remaining minutiae for determining authenticity as explained in step 22 and 24 of method 100.

The method 100 and the system of present invention has been tested on private fingerprint database having 1000 fingerprint images of 100 subject i.e. 5 images per subject per sensor. These fingerprint images are captured with two optical scanners with 500 dpi and image size of 300×300 pixels. The protocol of FVC2000 is followed for evaluating FAR (False Accept Rate) and FRR (False Reject Rate). For FRR total number of genuine tests (with no rejection) is (5*4)/2*100=1000. For FAR, total number of false acceptance tests (with no rejection) is (100*99)/2=4950. For the DB1 the method 100 provides AUC (Area Under the Curve) as 0.9977 and EER (Equal Error Rate) as 1.95%. For the DB2 the method 100 provides Area Under the Curve) as 0.9988 and EER (Equal Error Rate) as 1.33%. for the cross comparison i.e. DB1 vs DB2, the method 100 provides AUC (Area Under the Curve) as 0.9979 and EER (Equal Error Rate) as %.

Figure 9:
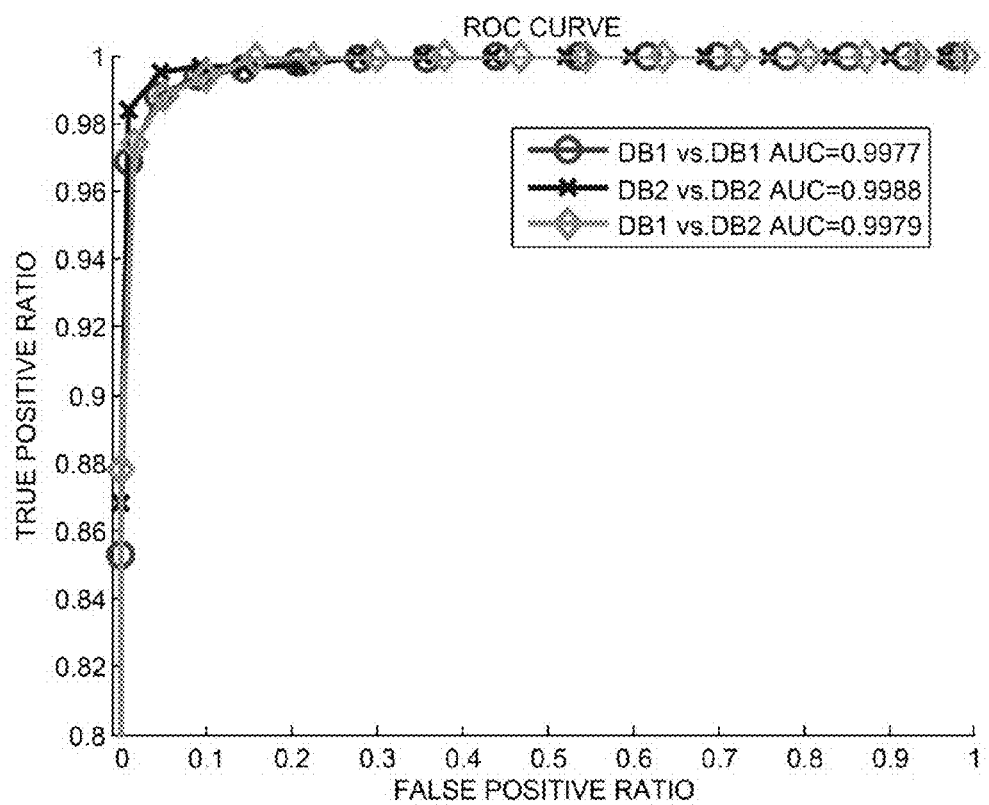
FIG. 9 shows ROC curve graph obtained by using method of the present invention.

FIG. 9 shows ROC curve graph obtained, by using method of the present invention.

Therefore, the present invention of the method 100 and the system has advantage of matching fingerprint images obtained from different fingerprint image capturing devices having different sensors. Further, the method 100 and the system are compatible with all existing Automatic Fingerprint Identification Systems (AFIS). Also, the method 100 and the system can be used for authenticating the fingerprint image even in case of elastic distortion due to uneven pressure applied during capturing fingerprint image and due to elasticity of the skin or tilted finger during scanning. Moreover, the method 100 and the system are robust and have higher accuracy.

The foregoing descriptions of specific embodiments of the present invention have been presented for purposes of illustration and description. They are not intended to be exhaustive or to limit, the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention,

We claim:

1. A method for matching fingerprint images obtained from different fingerprint image capturing, devices, partially captured images and nonlinear deformed images and implemented in an electronic device, the method comprising steps of:
   identifying minutiae of the fingerprint images;
   identifying a core point of the fingerprint images;
   determining line of symmetry of the fingerprint images;
   identifying candidate minutiae with matching ridge count, location angle and orientation angle from a first fingerprint image and a second fingerprint image of the fingerprint images;
   identifying prominent minutiae from the above identified candidate minutiae having three adjacent minutiae with similar local structure;
   eliminating out of scope minutiae by non-linear registration of fingerprint images based on ridge-count and position angle; and
   generating matching score based on number of candidate minutiae, prominent minutiae and common overlapped minutiae after non-linear registration of the second fingerprint image in comparison with the first fingerprint image for authentication.

2. The method as claimed in claim 1, wherein the identification of minutiae by matching ridge count, location angle and orientation angle of a first image of the fingerprint images with the second image of the fingerprint images is done by using a global matching engine.

3. The method as claimed in claim 1, wherein the identification of the minutia having three adjacent minutiae with same local structure (angle and distance) is performed by a local matching engine.

4. The method as claimed in claim 1, wherein the out of scope minutiae are eliminated by dividing the fingerprint image into eight parts and removing the non-matching portions.

5. A system for matching fingerprint images obtained from different biometric authentication devices implemented in an electronic device, the system comprising:
   a means for identification of minutiae of the fingerprint images;
   a means for identification of a core point of the fingerprint images;
   a means for identification of line symmetry of the fingerprint images;
   a global matching engine for identifying minutiae by matching ridge count, location angle and orientation angle of the first image of the fingerprint images with the second image of the fingerprint images;
   a local matching engine for identification of a minutiae having three adjacent minutiae with same orientation, thereafter eliminating out of scope minutiae by non-linear registration of fingerprint images based on ridge-count and position angle, and
   a matching engine for generating matching score of the second fingerprint image in comparison with the first fingerprint image for authenticating the fingerprint image.

6. The system as claimed in claim 1, wherein the electronic device is a computer, server or a biometric device.

\* \* \* \* \*